(12) United States Patent
Zhao et al.

(10) Patent No.: US 7,818,025 B2
(45) Date of Patent: Oct. 19, 2010

(54) METHOD AND SYSTEM FOR MAINTAINING A WIRELESS DATA CONNECTION

(75) Inventors: Wen Zhao, Kanata (CA); Shahid R. Chaudry, Ottawa (CA); T. L. Trevor Plestid, Ottawa (CA); Hao Xue, Ottawa (CA); Grace T. Y. Yeung, Napean (CA); Clifford W. Yanoshewski, Ottawa (CA)

(73) Assignee: Research In Motion Limited, Waterloo, Ontario (CA)

( * ) Notice: Subject to any disclaimer, the term of this patent is extended or adjusted under 35 U.S.C. 154(b) by 31 days.

(21) Appl. No.: 10/533,960

(22) PCT Filed: Jun. 16, 2003

(86) PCT No.: PCT/CA03/00875

§ 371 (c)(1),
(2), (4) Date: May 4, 2005

(87) PCT Pub. No.: WO2004/043092

PCT Pub. Date: May 21, 2004

(65) Prior Publication Data

US 2006/0063544 A1    Mar. 23, 2006

Related U.S. Application Data

(60) Provisional application No. 60/423,371, filed on Nov. 4, 2002.

(51) Int. Cl.
*H04M 1/00* (2006.01)
(52) U.S. Cl. .............. 455/550.1; 455/414.1; 455/424; 455/445; 455/450; 455/464; 455/510; 370/329; 370/341

(58) Field of Classification Search ............. 455/550.1, 455/414.1, 423, 445, 450, 464, 504, 63.1, 455/453, 502, 510; 370/229, 341, 298, 329
See application file for complete search history.

(56) References Cited

U.S. PATENT DOCUMENTS 4,827,507 A * 5/1989 Marry et al. ............. 380/38

(Continued)

FOREIGN PATENT DOCUMENTS

JP          10-224869          8/1998

(Continued)

OTHER PUBLICATIONS

U.S. Appl. No. 11/928,848, Notice of Allowance dated Dec. 29, 2009.

(Continued)

*Primary Examiner*—Nghi H Ly
(74) *Attorney, Agent, or Firm*—Mukundan Chakrapani; Borden Ladner Gervais LLP

(57) ABSTRACT

A system and method for establishing and maintaining an "always-on" data connection to a wireless network through the use of a back off timer and a service check timer is disclosed. The back off timer is initialized to a determined value when a connection is not established. When the timer expires, a connection attempt is made. As further connection attempts are made, the back off timer is set to ever-increasing values. When the data connection is established, the service check timer is initialized. The data connection status is determined at the expiry of the service check timer. When, at the expiry of the service check timer, the data connection is determined to be lost, the connection method is employed.

25 Claims, 5 Drawing Sheets

U.S. PATENT DOCUMENTS

| | | | |
|---|---|---|---|
| 5,748,620 A * | 5/1998 | Capurka | 370/328 |
| 6,163,692 A | 12/2000 | Chakrabarti et al. | |
| 6,249,681 B1 * | 6/2001 | Virtanen | 455/466 |
| 6,445,918 B1 * | 9/2002 | Hellander | 455/423 |
| 6,501,947 B1 * | 12/2002 | Hunzinger et al. | 455/414.1 |
| 6,625,198 B1 * | 9/2003 | Tiedemann et al. | 375/130 |
| 6,944,479 B2 * | 9/2005 | Andaker et al. | 455/560 |
| 6,978,119 B2 * | 12/2005 | Chen | 455/41.2 |
| 6,978,136 B2 * | 12/2005 | Jenniges et al. | 455/435.1 |
| 2002/0028674 A1 * | 3/2002 | Slettengren et al. | 455/422 |
| 2002/0082032 A1 * | 6/2002 | Hunzinger | 455/510 |
| 2002/0082033 A1 | 6/2002 | Lohtia et al. | |
| 2002/0183042 A1 * | 12/2002 | Thornton | 455/412 |
| 2002/0187746 A1 | 12/2002 | Cheng et al. | |

FOREIGN PATENT DOCUMENTS

| | | |
|---|---|---|
| JP | 10-051115 | 2/2002 |
| KR | 2002-80351 | 10/2002 |
| WO | 0147142 | 6/2001 |

OTHER PUBLICATIONS

PCT Patent Application No. PCT/CA2003/000875, International Search Report dated Jan. 5, 2004.

* cited by examiner

METHOD AND SYSTEM FOR MAINTAINING A WIRELESS DATA CONNECTION

CROSS-REFERENCE TO RELATED APPLICATION

This application claims priority from and is related to the following prior application: "METHOD AND SYSTEM FOR MAINTAINING A WIRELESS DATA CONNECTION," U.S. Provisional Application No. 60/423371, filed Nov. 4, 2002. This prior application, including the entire written description and drawing figures, is hereby incorporated into the present application by reference.

FIELD OF THE INVENTION

The present invention relates generally to managing connections to wireless networks. More particularly, the present invention relates to initiating and maintaining a connection to a wireless data network.

BACKGROUND OF THE INVENTION

Wireless data networks allow mobile devices to be remotely connected to services such as email distribution and internet browsing without connection to a conventional computer interface. Many publicly accessible data networks that can function over a wide area rely upon a cellular infrastructure and are tied to cellular protocols such as IS-95 which describes Code Division Multiple Access (CDMA) cellular communications, and the Global System for Mobile communications (GSM). Each cellular protocol has a companion data protocol. For GSM communications General Packet Radio Service (GPRS) is the packet data companion protocol, for IS-95 networks the "One Times Radio Transmission Technology" standard (1XRTT) defined in the CDMA2000 specification is the companion data protocol.

1XRTT provides CDMA2000 air interface devices with a packet based radio service that is capable of high data transmission rates, and supports both simple IP and mobile IP data connections. One disadvantage of the 1XRTT system is that network resources such as IP address are consumed simply maintaining a series of otherwise inactive connections. This is problematic for many carriers as resources such as the IP address space are finite and cannot be extended. As a result, carriers commonly drop inactive data connections when networks become congested to release occupied resources. Additionally, carriers often drop connections that have not been active for a fixed period of time regardless of network usage levels, so that resources are not allocated to inactive connections. A device that has been disconnected from the network due to inactivity typically releases its assigned network resources and only reconnects when the user of the mobile device attempts to access data services.

If a connection is terminated, the resources allocated to the mobile device are released. Thus upon reconnecting to the network, the mobile device is reassigned resources, which it typically then registers with a number of services. However, between the time the resources are released and the time at which the reacquired resources are registered, the device is not available for service. This is problematic for push enabled "always-on" devices since connections are important for bi-directional communications, which involve data transfers that are not initiated by the mobile device. If the wireless data connection is being used to push data from a remote server to a mobile device, the mobile device must remain connected, as a remote server cannot connect to a mobile device that the network has disconnected. Such a device requires an "always-on" 1XRTT data connection that is capable of automatically recovering from a disconnection.

Another problem presented by present 1XRFT devices occurs when a data connection cannot be immediately obtained. This can occur both at the time at which the device is initialized, and at the time that the device attempts to reacquire a connection. Typically the device will either continuously poll the network for a connection, or it will make a fixed number of connection attempts before it determines that a connection cannot be obtained at which time it will seek user interaction. The first method is counterproductive as it increases network traffic, which reduces the capacity for data channels. As a result, many networks prohibit continuous polling. If the device experiences difficulty connecting to the wireless data network, seeking user interaction merely notifies the user of the lack of connection, and does not assist in reacquiring the connection.

It is, therefore, desirable to provide a mobile device for connecting to a 1XRTT data network that is capable of maintaining an "always-on" data connection with automatic disconnect recovery to minimise the amount of time that a data connection is not available.

SUMMARY OF THE INVENTION

It is an object of the present invention to obviate or mitigate at least one disadvantage of previous methods of establishing and maintaining data connections in wireless networks.

In a first aspect of the present invention, there is provided a method of establishing a data connection on a wireless data network. The method comprises the steps of determining that no data connection to the wireless data network is established; initializing a back off timer based on a previous number of connection requests; automatically transmitting a connection request to the wireless data network upon expiry of the back off timer; and establishing a data connection if the transmitted connection request is accepted by the wireless data network. In an embodiment of the present invention, the wireless data network is a CDMA2000 network, and the step of determining that no data connection is established includes receiving a refusal of service message from the wireless data network, where the refusal of service message is selected from a list including Retry Order, Release Order, Reorder Order and Intercept Order messages or other failure events. In embodiments where the refusal of service message is an Intercept message, the connection request can be automatically transmitted upon detection of a new wireless data network. In another embodiment of the present invention, the back off timer is initialized to a value based on a random seed, and is optionally restricted to a value greater than or equal to any back off timer time calculated after a last established data connection. In yet another embodiment of the present invention, initializing the back of timer is based on a retry delay specified by the retry order, where the back off timer is optionally initialized to a time greater than or equal to the retry delay. In another embodiment, the connection request is an Origination Message in CDMA 2000 and Activate PDP Context Request in GPRS.

In a second aspect of the present invention, there is provided a method of automatically re-establishing a data connection on a wireless data network. The method comprises the steps of determining a data connection status upon the expiry of a service check timer; automatically transmitting a connection request if the data connection is determined to be lost; and reestablishing the data connection if the transmitted connection request is accepted by the wireless data network.

In an embodiment of the second aspect of the invention, the step of determining the data connection status is preceded by initializing the service check timer. In another embodiment, the step of automatically transmitting the connection request is performed upon expiry of a back off timer, where the back off timer is optionally initialized to a value based on a retry delay specified by a received Retry Order. In a further embodiment of the present invention, the step of determining the data connection status includes comparing assigned network resources to default values, where the step of comparing optionally includes determining that no data connection is established when an assigned Internet Protocol address is set to 0.0.0.0.0. In a further embodiment, the method includes a step of forcing premature expiry of the service check timer upon receipt of a Release Order. In other embodiments of the invention, the Release Order is a Point-to-Point-Protocol termination request and the connection request is an Origination Message in CDMA2000 and Activate PDP Context Request in GPRS.

In a third aspect of the present invention, there is provided a mobile device for establishing and maintaining a data connection to a wireless data network. The mobile device comprises a back off timer, a service check timer and a connection manager. The back off timer is for timing a back off period. The service check timer is for timing a service check period. The connection manager is for determining that a data connection to the wireless network is established at expiry of the service check timer, resetting the service check timer upon its expiry if a connection is established, transmitting connection requests to the wireless network upon initialisation, upon expiry of the back off timer and upon determination that the established data connection has been lost, and for resetting the back off timer in response to receipt of a connection rejection from the wireless network. In an embodiment of the present invention, the wireless data network is a CDMA2000 network. In another embodiment of the present invention, the connection manager includes means to reset the back off timer in response to the receipt of a Retry Order, such that the back off timer is greater than, or equal to, a retry delay specified in the Retry Order. In a further embodiment of the present invention, the connection manager includes both an accumulator for tracking consecutive rejections of service, and means to reset the back off timer in accordance with the number of consecutive rejections and means for causing premature expiry of the service check timer in response to the receipt of a Release Order.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides a method and system for establishing and maintaining a data connection between a mobile device and wireless data network. For mobile devices that rely upon being pushed data in real time, maintaining a data connection to the wireless data network is an important design requirement. However, it is generally undesirable for the network operator to allow data connections to be permanently maintained for all devices. Networks lack both a simple method of identifying devices that require always-on connections, and a simple means to prioritize device connections. Thus, networks are designed to indiscriminately disconnect mobile devices under a number of circumstances to prevent or relieve congestion. As a result, even if a mobile device is able to secure an initial data connection the data connection may be severed by the network at a future time. The present invention mitigates the problems of the prior art by providing both a mobile device and method for obtaining a data connection and maintaining the connection once it is in place.

After being powered up, a mobile device of the present invention typically seeks a CDMA2000 data network to connect to and negotiate with. If successful, the negotiation results in the network assigning the mobile device the network resources required for a data connection. Among the resources assigned is an IP address that uniquely identifies the mobile device. Typically, these resources are obtained by the mobile device through the transmission of a data-based Origination Message to the wireless data network. Once the data connection is established, data traffic can be pushed from a server to the mobile device by transmitting data packets to the IP address assigned to the mobile device.

Figure 1:
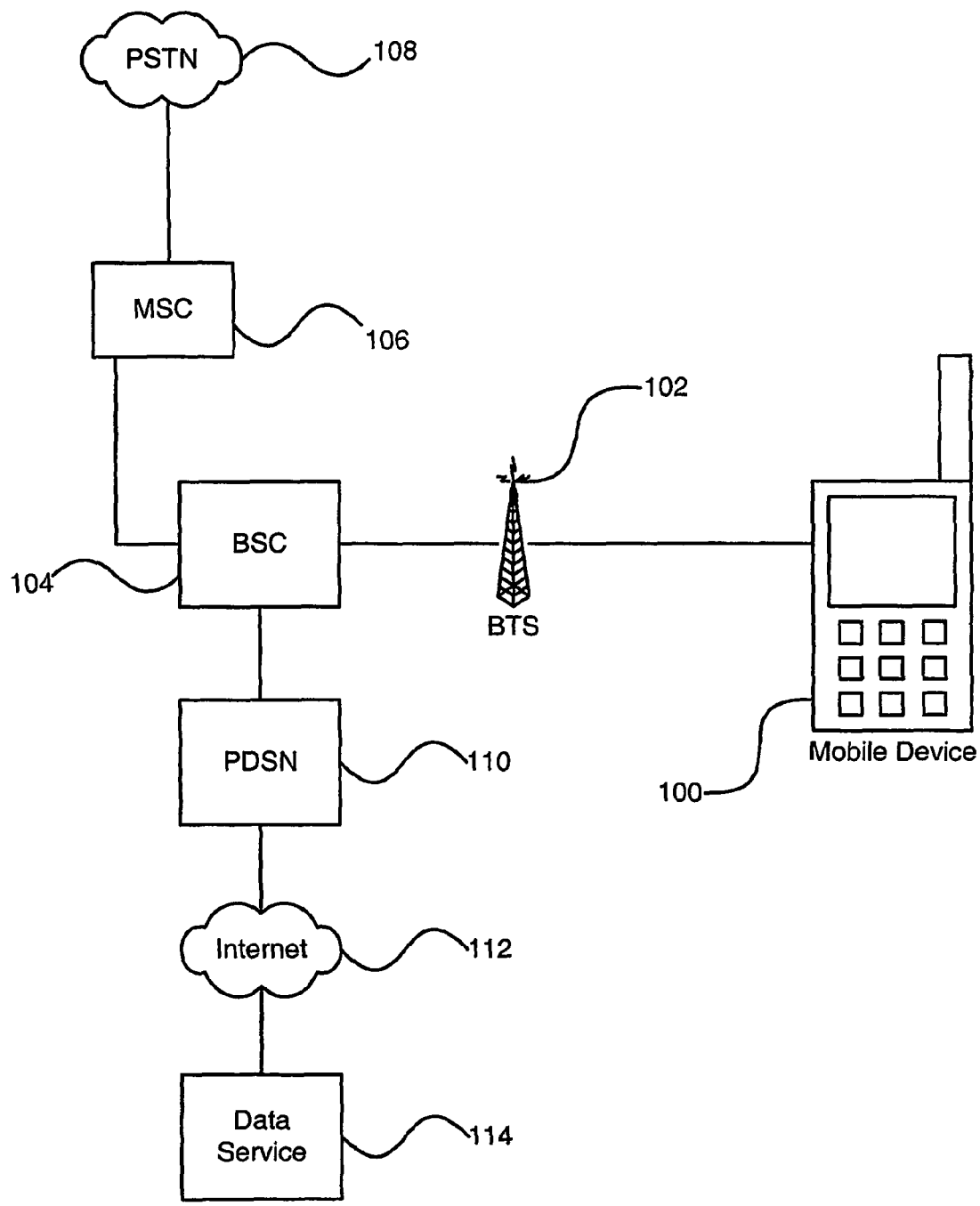
FIG. 1 is a block diagram of a mobile device in a wireless data environment.

FIG. 1 illustrates the connection of a mobile device of the present invention to a wireless network capable of providing both voice and data telephony services. A mobile device 100 connects over a wireless link to a base transceiver system (BTS) 102. BTS 102 serves as both a transmitter and receiver for data exchanged between mobile device 100 and the wireless network. BTS 102 is controlled by base station controller (BSC) 104, which in a preferred embodiment connects to a plurality of BTSs. This allows mobile device 100 to move outside the range of BTS 102 and remain connected to the wireless network so long as it is in the range of another BTS. BSC 104 connects mobile device 100 to the mobile switching center (MSC) 106, which allows voice based telephony calls to be placed to public switched telephone network (PSTN) 108 or another wireless network (not shown). BSC 104 also connects mobile device 100 to public switched data network (PSDN) 110. PSDN 110 allows data traffic from mobile device 100 to be routed from the wireless network to another connected network, such as Internet 112. Connected to Internet 112 is a data service 114, which is accessible to mobile device 100. Upon negotiating a data connection, mobile device 100 is provided with an IP address, and optionally a domain name. Mobile device 100 can then connect to data service 114. Thus, to push real time data to mobile device 100, data service 114 simply addresses data packets to the IP address provided, and transmits them through Internet 112 and the wireless network to mobile device 100.

Figure 2:
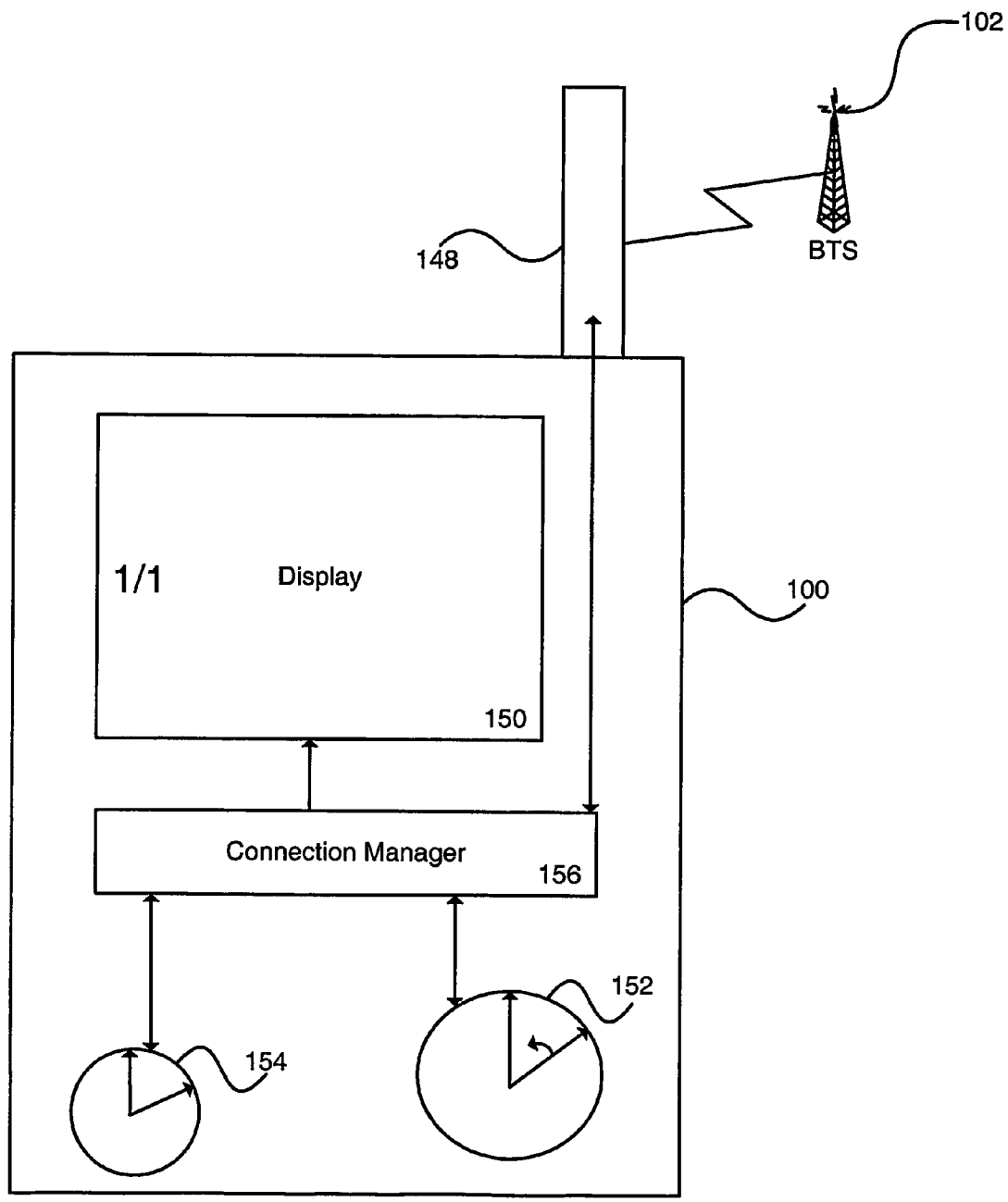
FIG. 2 is a block diagram of a mobile device of the present invention.

FIG. 2 illustrates a presently preferred embodiment of mobile device 100. Mobile device 100 is a wireless communication device for receiving data from, and transmitting data to, BTS 102. Typically the connection to BTS 102 is achieved using antenna 148 to establish a data channel through the air interface physical layer. Reference made to checking a connection, except where made explicitly clear to the contrary, refers to determining if a data channel is in place to logically attach mobile device 100 to the network using the RF physical layer link. The connection status is typically provided to the user of mobile device 100 by means of a visual indication on display 150. The status of the connection is monitored by connection manager 156, which provides display 150 with a status indication, and is used to establish a connection on power up. Connection manager 156 maintains the connection, once established, by re-establishing a connection, using the connection establishment methods of the present invention, when the connection is released.

Figure 3:
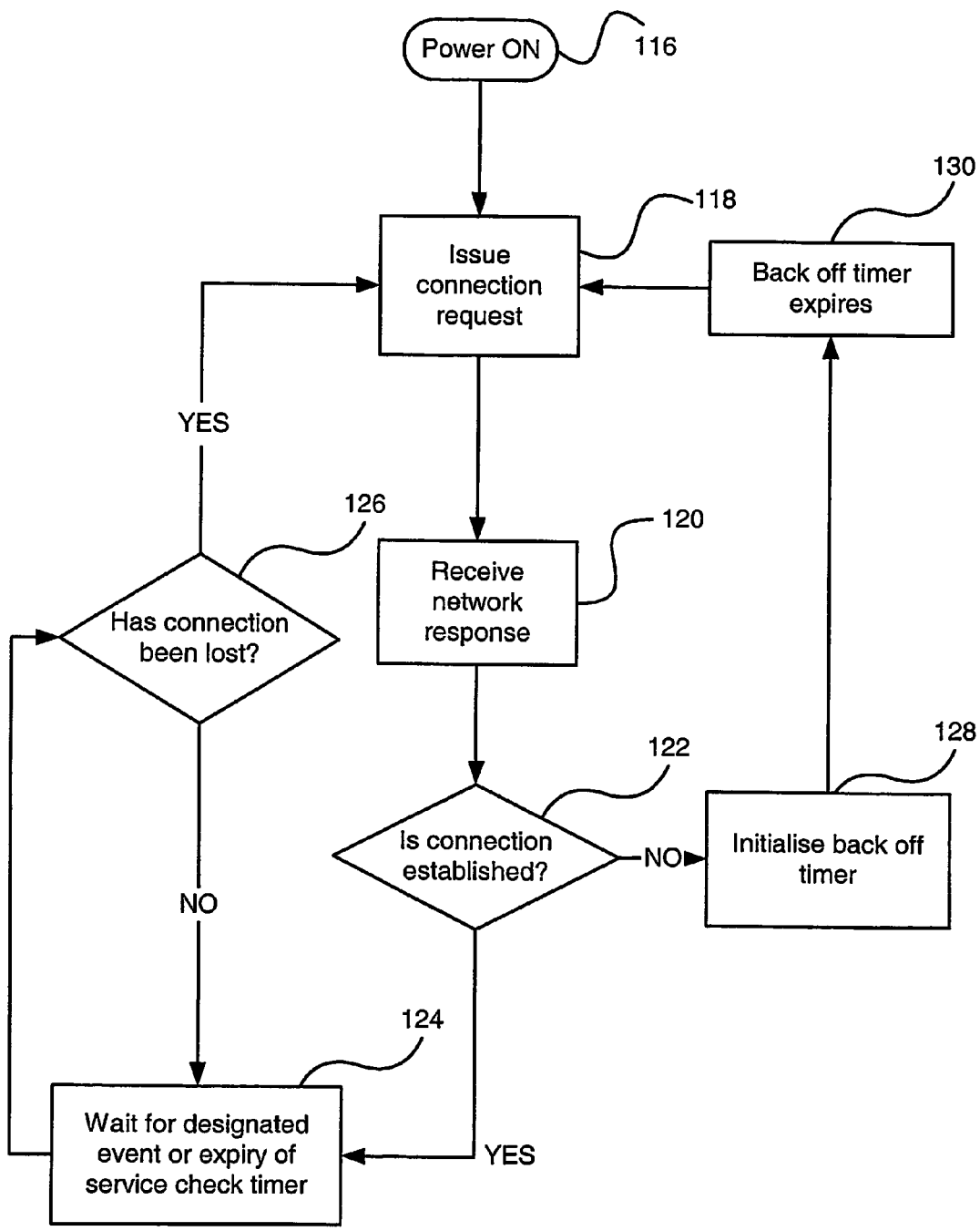
FIG. 3 is a flowchart illustrating of a method according to an embodiment of the present invention.

Connection Manager 156 determines the status of the connection, as described in relation to FIG. 3, when a variety of events occur. These events include receipt of a Release Order, receipt of a PPP Termination Request, and the expiry of Service Check Timer (SCT) 154, one skilled in the art will appreciate that other failure events can also cause connection manager 156 to determine the status of the connection. SCT 154 is used to ensure that connection manager 156 checks the connection at minimum fixed intervals. Connection manager 156 can also reset SCT 154 when either SCT 154 expires or upon receipt of data traffic. As described in below, upon determining loss of connection, connection manager 156 issues a connection request message to the network via antenna 148 and BTS 102. If the connection request message is rejected connection manager 156 sets back off timer (BOT) 152, to a value preferably determined by a random seed. Upon expiry of BOT 152, connection manager 156 re-issues a connection request in the form of an Origination Message.

Wireless networks are designed to handle congestion in a number of ways. Typically, if a network is overly congested when a connection request message is received, the connection is refused, no network resources are assigned, and a Reorder Order or a Release Order is issued to mobile device 100. The Reorder Order serves to notify mobile device 100 that the network is busy and therefore cannot provide service. In its initial implementation a Reorder Order was designed to notify a user of a wireless device that the network was too congested to accept a new voice connection. Use of the Reorder Order has been extended by some network operators to serve as a rejection message for data services in addition to voice services. For voice based connections, the receipt of a Reorder Order typically results in a warning tone. Many devices do not provide this warning tone when a Reorder Order is received as a result of a failed data connection attempt. Even if a device is designed to provide the warning tone to indicate the receipt of a Reorder Order in response to a failed data connection, it is impractical to expect that a user of an always-on device, such as mobile device 100, will manually retry to reconnect until a connection is obtained.

In a voice only implementation, a user typically either attempts to re-initiate the connection by redialling, or the wireless device periodically attempts to reconnect. To maintain an "always-on" connection in a data environment, mobile device 100 must transmit repeated connection request messages until a connection is established and "pushed" data can be received. An "always-on" device that relies upon push technology to receive information from a host on the network must maintain the data connection. Constant polling of the network is discouraged by carriers as it is counter-productive and simply consumes bandwidth that could otherwise be allocated to active data connections. Continuous or periodic polling to determine the availability of a connection increases network congestion, which is counterproductive to establishing a connection, and decreases the effective battery life of the mobile device, which cannot remain in a power saving mode when transmitting the polling packets or receiving the replies to them.

Congestion in a wireless network can also result in the termination of already established data connections. If the mobile device is connected, but not actively using its channel, the network can reduce congestion by issuing a Release Order, which causes the mobile device to release the resources allocated to it. Typically, upon receiving a Release Order, mobile device 100 resets its assigned network resources to a default value. In a presently preferred embodiment, mobile device 100 resets its IP address to "0.0.0.0.0". These congestion management features, along with events such as the mobile device entering a region of poor coverage and service option rejections due to incompatibility between the mobile device settings and the network, can cause mobile device 100 to lose the data connection to the network.

Retry Orders are known in the art and are a data based analog to a Reorder Order. Typically a Retry Order is provided in response to an Origination Message if the network cannot provide a connection. Typically, Retry Orders specify a retry time that mobile device 100 must wait before retrying to establish the connection. Retry Orders can also be transmitted to mobile device 100 to either clear or increase a previously provided retry time. If a number of mobile devices are all provided Retry Orders that expire simultaneously there will be increased contention for the connections at the time of the retry timer expiry.

Several options exist for either establishing a data connection after being initially refused a connection, or re-establishing a released data connection. Transmitting a series of spaced apart connection request messages, and allowing mobile device 100 to go into a power saving mode in the time between connection request message transmissions provides a reasonable chance of connection establishment, and prevents excess battery consumption.

Mobile device 100 preferably generates a connection request message data call when it detects CDMA2000 services. FIG. 3 illustrates a method of establishing a connection according to the present invention. Mobile device 100 is powered on in step 116. As part of its start up routine, mobile device 100 issues a connection request to the wireless network in step 118. In a presently preferred embodiment of the present invention, the connection request is an Origination Message in CDMA2000 and Activate PDP Context Request in GPRS. After transmitting the connection request in 118, mobile device 100 typically receives the network response in step 120. In step 122, the response is analysed to determine if the connection has been established, as is well known in the art. When the connection is established in step 122, a service check timer (SCT) is started, and upon its expiry in step 124, the IP address assigned to mobile device 100 is compared to "0.0.0.0.0" to determine if the connection still exists. In a presently preferred embodiment, the service check timer is started after mobile device 100 enters an inactive data mode. As is well understood in the art, mobile device 100 resets its IP address to a default value, "0.0.0.0.0" in this implementation, when a connection is no longer available. One skilled in the art will readily appreciate that a number of other connection checking techniques are known, and can be substituted for this test without departing from the present invention. If the connection is still established the IP address will not be "0.0.0.0.0", and the process returns to step 124, if the connection has been dropped, the process returns to step 118 and issues a new connection request.

If in step 122 it is determined from the network response received in 120 that the issued connection request message did not establish a connection, a back off timer is initialized in 128. It is preferable that this step only occurs if the failure to connect is not due to the receipt of an intercept order. A presently preferred method of handling an intercept order is described below. In a presently preferred embodiment, the back off timer is started by calculating a back off time. If the back off timer is determined to have expired in step 130, the process returns to step 118.

In a presently preferred embodiment, the connection timer is set in 128 using a back off algorithm provided by a timer initializer, preferably one seeded with a random value. Randomly seeded back off times allow a plurality of mobile devices, that have all simultaneously been disconnected, to provide the network with spread out requests, to prevent congestion due to an influx of connection request messages. In a further embodiment, the back off algorithm periodically increases the amount of time between retries. Thus, mobile device 100 retries for a connection at fixed intervals that increase at a predetermined rate. This is implemented to provide battery life savings. Battery life is extended in most cases because when mobile device 100 cannot establish a connection after a series of rapid requests, it is likely that either there is a network problem or mobile device 100 has left an area with proper service. In either case, sending connection requests spaced evenly apart does not statistically increase the chances of establishing a connection quickly. By increasing the time intervals between attempts, mobile device 100 is able to wait in a power saving mode, which will extend battery life.

In a further embodiment, after being initialized in step 128, the backoff timer is compared to the information provided in a Retry Order. If the Retry Order specifies a minimum retry period, the back off timer is adjusted so that it is not less than the retry period. This ensures that mobile device 100 does not attempt to re-establish a connection until after the retry period has expired. Alternately, the timer is always set to the time value specified in the Retry Order, if one is provided, and set to the calculated value only if there is no time value specified in the Retry Order.

Mobile device 100 is typically controlled by an operating system that provides the user with an interface to the functionality, such as email distribution, of mobile device 100. In a presently preferred embodiment, received Reorder Orders result in an "event" that is passed to the application layer of mobile device 100. The application layer is designed to implement the above method to establish a connection, and applies the appropriate back off re-connect algorithm to set the back off timer. When the back off timer expires, the application layer issues another connection request message; If re-connection fails, and another Reorder Order is received, another random back off period is applied. In a presently preferred embodiment, a back off period is equal to or greater than the previous back off period, so that the length of time between retries is non-decreasing. Preferably, until the connection is established a "No Data Service" indication is displayed on the user interface of mobile device 100 so that the user knows that data service is not available. When a connection is established, mobile device 100 preferably indicates the availability of data service to the user on the user interface.

When a Retry Order is received in response to an connection request message, the BSC 104 typically specifies a retry delay inside the Retry Order. In this case, the application layer of mobile device 100 calculates a back off timer as before, but requires that the timer not be shorter than the retry delay. Retry orders in the CDMA2000 specification can also include information about other service options that are available. If these alternative service options are supported, mobile device 100 can send a connection request message with alternative service options during the retry delay. If any of the connection request messages transmitted with alternate service options is successful, the back off timer is preferably cancelled by the application layer. Otherwise mobile device 100 waits until the back off timer expires, and then transmits another Origination Message with the original service option.

The network can also send a Retry Order with retry delay set to zero. This is to indicate to a wireless data device that there is no retry delay. Such a Retry Order is commonly used by carriers to clear previously set retry delays. When a Retry Order with retry delay set to zero is received by a mobile device, the application layer will preferably cancel any pending retry delay timer and immediately retransmit an Origination Message.

When mobile device 100 powers up, its IP address is typically initialized to "0.0.0.0.0". Mobile device 100 may have its IP address reset to this address, or another default value, if BTS 104 transmits a Release Order, with PPP Termination Request. When such a request is received, or when the service check timer expires, as in step 124, mobile device 100 examines its IP address. If the IP address is set to its default value, mobile device 100 starts data connection request and PPP renegotiations, as described in step 118. If along with the PPP termination request, a Reorder Order or Retry Order is transmitted, mobile device 100 will wait until the expiry of the calculated back off timer before returning to step 118.

Figure 4:
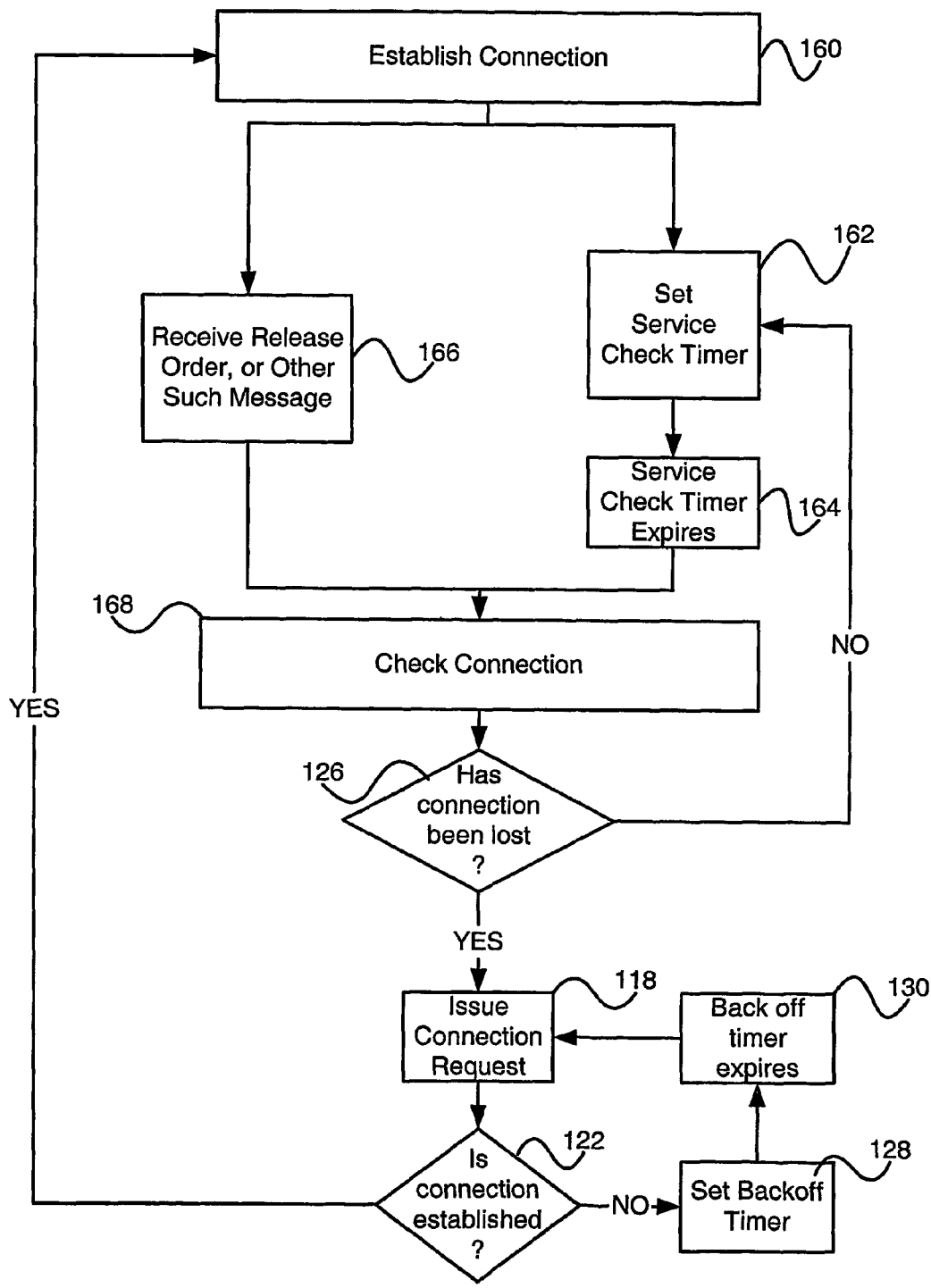
FIG. 4 is a flowchart illustrating a method of the present invention.

FIG. 4 illustrates an exemplary embodiment of a method of the present invention. Upon establishing a data connection in step 160, mobile device 100 initializes SCT 154 in step 162. Preferably, the initialisation of SCT 154 in step 162 is preceded by the cessation of data transmissions, as it is not strictly necessary to check the status of a connection that is in use. When SCT 154 expires at step 164 connection manager 156 checks the connection status in step 168. Alternatively, connection manager 156 checks the connection status in 168 if a Release Order, or other such message is received in 166. In one embodiment of the present invention, upon receiving a Release Order in step 166, the SCT 154 is reset to 0 to cause the connection check in step 168. Steps 126, 118 122, 128 and 130 are carried out as described in relation to FIG. 3.

Figure 5:
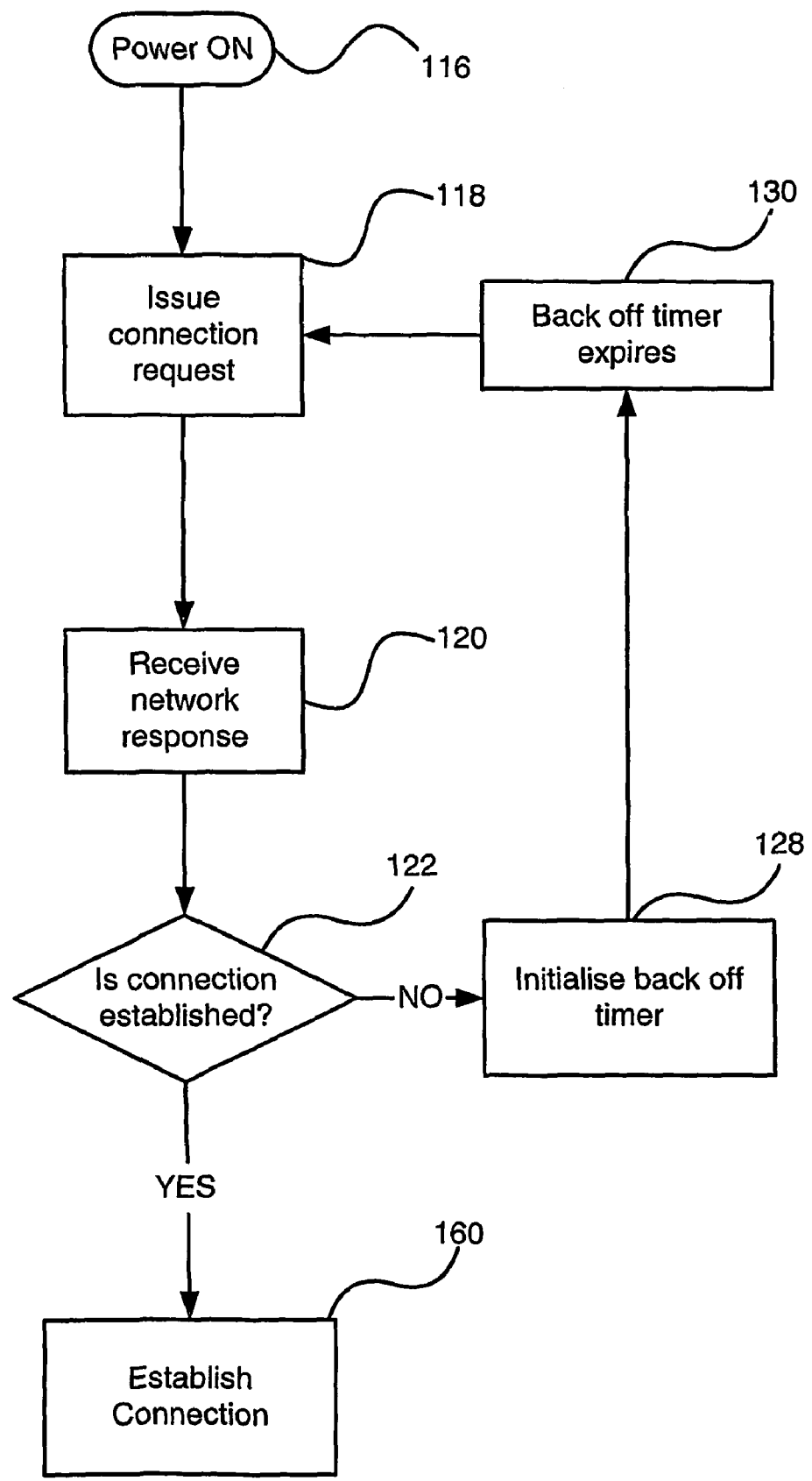
FIG. 5 is a flowchart illustrating a method of the present invention.

FIG. 5 illustrates an exemplary embodiment of the persistent attach method of the present invention. Mobile device 100 is powered on in step 116, and a connection request is issued in step 118. In a presently preferred embodiment, the connection request is a Origination Message in CDMA2000 and Activate PDP Context Request Message in GPRS. The network response is received in step 120. In step 122 mobile device 100 determines if a connection has been established. If it is determined that a connection has been established in step 122, mobile device 100 proceeds to step 160, which can be used as the starting point of the method of FIG. 4. If a connection is not established, BOT 156 is initialized in step 128, and upon its expiry in step 130, a connection request is re-issued in step 118.

In a number of circumstances, such as roaming on an unauthorized network, mobile device 100 can fail a network authentication challenge. In the event of a failed network authentication challenge, mobile device 100 receives an Intercept Order. In a presently preferred embodiment, mobile device 100 does not set its back off timer, but waits until it has detected a new network before re-issuing a connection request. During this period of time the user can be notified that there is a lack of service through an indication on the display or through an audio cue. One skilled in the art will readily appreciate that a number of techniques known in the art exist for detecting the presence of a new network.

The back off algorithm described above is preferably employed in the following manner. Mobile device 100 determines that it no longer has a data connection, as in step 124. In a presently preferred embodiment this is determined by the verification of an IP address in step 126, where an address of "0.0.0.0" indicates that the connection has not been maintained. If it is determined that a connection is not available, mobile device 100 attempts to connect to the wireless data network in step 118. If the connection is successful, then the process is completed, and the device waits for the expiry of its service check timer in step 124. In a presently preferred embodiment, the service check timer is only set after data activity has stopped, so step 124 is preferably preceded by the cessation of data transmission after data activity has stopped. If a connection is not established, as determined in steps 120 and 122, the response from the network, received in step 120, is examined. If the response from the network does not prescribe when a reconnection attempt will be allowed, the back off timer is initialized to a value determined based on the number of previous attempts to connect, and the network conditions, as described in conjunction with step 128. When the back off timer expires in step 130, a connection request is reissued and the process returns to step 118. If this reissued connection request results in a connection then the process is completed, and the device returns to step 124. If the connection is unsuccessful, the timer is reinitialized in 128 to either a recalculated value or a value provided by the network. This repetition of setting the back off timer and requesting a connection is continued until the connection is established, or the device is powered down.

It is preferable that the BOT value be no less than the value of a previous timer, and that in the event that a Retry Order specifies a retry period, the longer of the retry period and the randomly generated back off timer is used as the time until the next retry.

In a presently preferred embodiment of the invention, the timer values are precalculated to avoid sending requests at intervals so frequent that network congestion arises from the requests and so that battery life is not detrimentally affected. In one embodiment of the present invention, the back off timer is first initialized to a value of 30 seconds, and increases by 30s intervals at each subsequent attempt. This is done with the assumption that if a connection is repeatedly refused the device is likely in an area without data service, and the interval between checking for data service can be extended without adverse effects. It is fully anticipated that the user can attempt to manually initiate service.

The present invention provides a method and system for both establishing an always-on data connection to a network by a persistent retry method and for maintaining the established data connection by determining the connection status at the expiry of a service check timer. The variable back-off timer used between connection retries provides for increased battery life without significantly delaying connection re-acquisition. One skilled in the art will readily appreciate that mobile device 100 will utilise the variable back-off timer, as described above, during its initialization in response to a Release Order, an Intercept Order, a Reorder Order, a Retry Order, or in the event that the network does not respond. In the event of receiving a Release Order with service option rejection where the device does not support other types of data services, the device holds off data origination until a new network is found. In the event of receiving a Release Order with service option rejection, and the device does support other types of data services, mobile device 100 will preferably attempt a connection with different service options, possibly in addition to the standard retry. If the response to the connection request message is an Intercept Order, mobile device 100 preferably checks for a new network at the expiry of the variable back-off timer, and only attempts a reconnection if a new network has been identified. In the event that no response is received from the network, it is likely that mobile device 100 is out of service, and another connection request message is transmitted when a network is detected. Additionally, one skilled in the art will appreciate that the variable back off timer of the present invention provides an improved connection recovery from the receipt of a Release Order with PPP termination request, a network dormancy timer expiry or a Reorder Order. Thus the present invention provides a mechanism to reduce the amount of time spent out of service. It will be apparent to one skilled in the art that upon reconnection mobile device 100 preferably checks with the network to determine whether or not any events were missed during the period without service.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method of automatically maintaining a data connection on a wireless data network, comprising:
   determining, at minimum fixed time intervals determined by a service check timer, the status of a previously established data connection;
   automatically transmitting a connection request if the previously established data connection is determined to be lost; and
   re-establishing the previously established data connection if the transmitted connection request is accepted by the wireless data network.

2. The method of claim 1, wherein the step of determining the status of the previously established data connection is preceded by initializing the service check timer.

3. The method of claim 1, wherein the step of automatically transmitting the connection request is performed upon expiry of a back off timer.

4. The method of claim 3, wherein the back off timer is initialized to a value based on a retry delay determined in response to a refusal of service message.

5. The method of claim 1, wherein determining the status of the previously established data connection includes comparing assigned network resources to default values.

6. The method of claim 5, wherein the step of comparing includes determining that no data connection is established when an assigned Internet Protocol address is set to 0.0.0.0.0.

7. The method of claim 1, wherein the wireless data network is a CDMA2000 network.

8. The method of claim 7, wherein the connection request is an Origination Message.

9. The method of claim 7, wherein determining that the previously established data connection is lost includes receiving a refusal of service message from the wireless data network.

10. The method of claim 9, wherein the refusal of service message is an Intercept Message.

11. The method of claim 10, wherein the connection request is automatically transmitted upon detection of a new wireless data network.

12. The method of claim 9, wherein the refusal of service message is one of a Retry Order, a Reorder Order and a Release Order.

13. The method of claim 12, including a step of forcing premature expiry of the service check timer upon receipt of a Release Order.

14. The method of claim 13, wherein the Release Order is a Point-to-Point-Protocol termination request.

15. The method of claim 12, further including initializing a back off timer on receipt of the refusal of service message.

16. The method of claim 15, wherein initializing the back off timer is based on a random seed.

17. The method of claim 15, wherein the back off timer is initialized to a time greater than or equal to any back off timer time calculated after a last previously established data connection.

18. The method of claim 15, wherein initializing the back off timer is based on a retry delay specified by a Retry Order.

19. The method of claim 18, wherein the back off timer is initialized to a time greater than or equal to the retry delay.

20. A mobile device for establishing and maintaining a data connection to a wireless data network, the mobile device comprising:
   a back off timer for timing a back off period between retries to establish the data connection;
   a service check timer for setting a minimum fixed interval after which a previously established data connection is checked to determine if it has been lost; and
   a connection manager for determining if the previously established data connection between the mobile device and the wireless network exists or has been lost; for resetting the service check timer upon its expiry if the data connection exists; for transmitting connection requests to the wireless network upon initialization, upon expiry of the back off timer, and upon expiry of the service check timer if the previously established data connection has been lost; and for resetting the back off timer in response to receipt of a connection rejection from the wireless network.

21. The mobile device of claim 20, wherein the connection manager includes an accumulator for tracking consecutive rejections of service, and means to reset the back off timer in accordance with the number of consecutive rejections.

22. The mobile device of claim 20, wherein the wireless data network is a CDMA2000 network.

23. The mobile device of claim 22, wherein the connection manager includes means to reset the back off timer in response to the receipt of one of a Retry Order, a Reorder Order and a Release Order.

24. The mobile device of claim 23, wherein the connection manager includes means for causing premature expiry of the service check timer in response to the receipt of a Release Order.

25. The mobile device of claim 23, wherein the means to reset the back off timer includes means to reset the back off timer such that the back off time is greater than, or equal to, a retry delay determined in response to a Retry Order or a Release Order.

* * * * *